G. B. GILMAN.
ENGINE DETECTOR.
APPLICATION FILED FEB. 11, 1914.
1,125,510.
Patented Jan. 19, 1915.
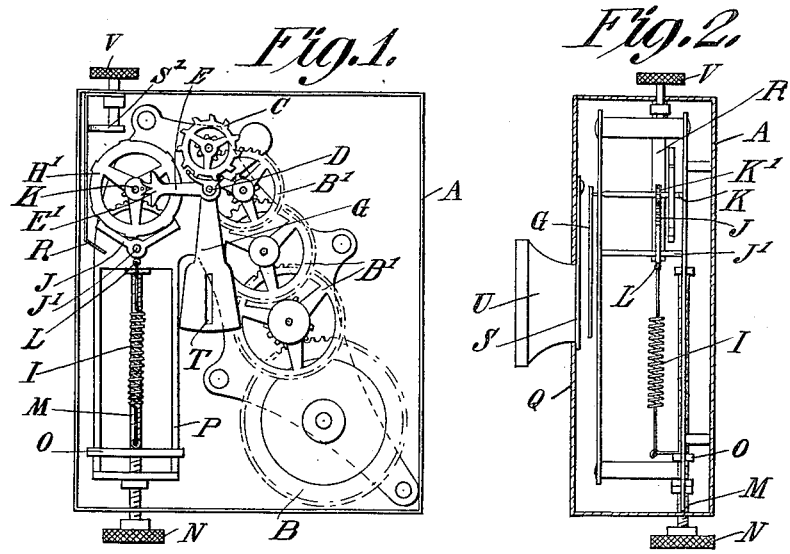
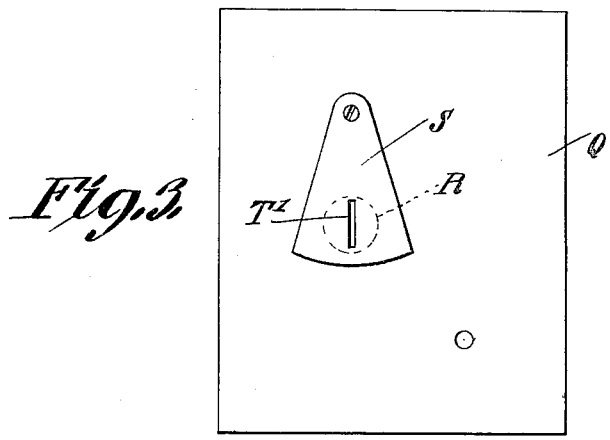
G. B. Gilman,
Inventor

UNITED STATES PATENT OFFICE.

GEORGE BEAN GILMAN, OF GARDINER, MAINE.

ENGINE-DETECTOR.

1,125,510. Specification of Letters Patent. Patented Jan. 19, 1915.

Application filed February 11, 1914. Serial No. 818,113.

*To all whom it may concern:*

Be it known that I, GEORGE B. GILMAN, a citizen of the United States, residing at Gardiner, in the county of Kennebec and State of Maine, have invented a new and useful Engine-Detector, of which the following is a specification.

One object of the specification is the provision of a detector, by means of which an unsteady or intermittent action in a fly wheel and consequently the operation of an engine may be determined accurately, the present apparatus or instrument being small and compact to permit of the ready handling of the same so that the party operating it may hold the same in both hands and sight with one eye, so as to detect any uneven operation of the engine.

A further object of the present invention, is the provision of a detector of this character which is provided with a spring motor and an escapement mechanism connected thereto for operating a swinging shutter which is adapted to be disposed or placed into and out of registration with an observation aperture, thus providing means that can be readily carried in the hands of the one detecting, and thus be a self-contained adjustable mechanism that may be wound similarly to a clock and which will operate for a sufficient period of time to carry out the detecting test.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a view showing the complete operating mechanism for the swinging shutter, the portion carrying the observation aperture being removed. Fig. 2 is a side elevation of the complete device minus the spring motor and its train of gears. Fig. 3 is a rear elevation of the observation aperture plate *per se*.

In the drawings, A designates a casing, which carries therein, the spring motor B which operates through the train of gears B', the escapement wheel C, this structure being similar to the usual form of spring operated clocks, and being approximately of a size that is conveniently manipulated by both hands of the operator. Pivoted at D is the swinging arm E, which has a portion thereof in coöperable relation to the escapement wheel C, while its free end E' which is bifurcated and provided as shown with four teeth engages the hub of the balance wheel H, at points eccentric thereof, so that such balance wheel due to the action of the spring upon the escapement wheel, will be oscillated, as in a clock, and provides the operating mechanism for this device. Upon the arbor K of the balance wheel H, is a pinion K' which meshes with the toothed segment J carried upon the transverse shaft J'. Connected at L to the toothed segment J is one terminal of the coiled spring I whose other terminal is connected to the interiorly threaded bar O mounted upon the vertically disposed feed screw M. The bar O is mounted for sliding movement upon the frame P so that as the screw M is rotated through the instrumentality of the knob N, the bar O is moved relatively to the frame P and consequently the tension of the spring I is adjusted. By this means, the speed of oscillation of the balance wheel and consequently the arm or lever E is determined.

Connected to and carried upon the shaft D' is an arm G, which constitutes a pendant shutter provided with the elongated aperture T. It will thus be seen that as the motor B operates the train of gears, that the shutter G will be oscillated and therefore present the slot T in the same position twice during each oscillation.

In the plate Q of the casing as illustrated in Fig. 3, there is provided a circular aperture R and adjustably attached to said plate is an apertured plate S, having the elongated aperture T' which may be adjusted relatively to the aperture R according to the angularity of which the present instrument is to be used. The shape and length of the aperture or slot T' is similar to the slot or aperture T of the shutter G, and at certain periods of the oscillation of the shutter G these slots or apertures exactly register, this being as before stated, once every movement or twice each complete oscillation of the shutter.

Attached to and carried upon the outside of the casing, is the observation member or tube U, which is in registration with the opening R so that the operator in gripping the present instrument in one or both hands with the tube U to one eye, will look through the stationary slot T' and each time that the slot T of the shutter G registers therewith, a clear vision for the instant will be given.

To lock the device from operation, a spring plate R whose tension normally places its free end in the path to engage the segment J, is provided. To move the same from engagement with the segment, a cam S' is carried by the knobbed stem V, so that as the stem is rotated manually, the free end of the plate R is moved away from the segment or permitted to move toward and lock it.

With the present device, the exact speed of the engine is not determined, but the question as to whether the speed is uniform or intermittent can be determined.

In order to determine the steadiness of high speed engines, it is necessary that the shutter G oscillate rapidly, or what is known in photography as instantaneous, and such openings as T and T' must be so shaped and arranged, that persistent vision gives a clear view through the hole or apertures while the same is opening and shutting, as looking through a rapidly rotating spoked wheel.

It has been found in practice, that the closed period must be more, or of greater duration than the open period, the difference depending upon the use of the instrument and the conditions under which it is to be used. The special purposes for which this instrument is designed, is to test the uniformity of the speed of engines, or any other kind of machinery that contains rotary parts that should rotate at a steady, instead of an intermittent speed, and with this device, an intermittent, spasmodic or variable speed may be ascertained.

In carrying out the present invention, the feed screw M is adjusted to permit the imparting of movement to the shutter G, at the desired speed, and where desirable, a white sheet or screen is placed at one side of the engine adjacent the fly or balance wheel thereof, while the person desiring to detect will stand approximately 15 feet from the wheel at the opposite side to the screw. With the observation member U disposed at one eye of the operator, the other eye being closed, the operator now looks through the slot T' toward the fly wheel of the engine, and the adjusting nut N is then adjusted if need be, so as to regulate the speed of the shutter G or until the spokes in the fly wheel are apparently still or motionless, that is when the shutter G is in synchronism with the motion of the spokes of the fly wheel. By continually watching the movement of the fly wheel through the apertures T and T', the fly wheel continues to move so that the spokes appear motionless, the speed of the engine is unvariable and steady, while should the wheel apparently stop for a second and turn in a reverse direction very slowly it will indicate instantly that the governor of the engine is not operating as it should and taking care of the varying load upon the engine.

From the foregoing description it is evident that with a device of this character which is, as before stated, small enough to be carried in the hands of the operator, in a short time any fault in the operation of the governor may be detected and corrected.

What is claimed is:

1. In a device of this character, a support, a spring motor mounted therein, an escapement device operably connected to the spring motor, an adjustable balancing mechanism, a lever connecting the escapement device and balancing mechanism, a shutter having a peep-hole connected to be oscillated by the lever, and a fixed observation member with which the peep-hole alines during the oscillation of the shutter.

2. In a device of this character, a support having a fixed peep-hole therethrough, a spring motor mounted in the support, an escapement device operably connected thereto, a balancing mechanism, means for adjusting the same, a lever connecting the escapement device and balancing mechanism, and a shutter having a peep-hole, said shutter being connected to the lever to be oscillated thereby, whereby said peep-hole is oscillated to be placed into and out of registration with the fixed peep-hole.

3. In a device of this character, a support having a stationary peep-hole, a spring motor mounted in the support, an escapement device operably connected to the spring motor, an adjustable balancing mechanism, a spring connected thereto, manually controlled selective means for adjusting the spring and the balancing mechanism thereby, a lever connecting the escapement device and balancing means to be oscillated by the spring motor through the escapement device and at variable speeds according to the balancing device, and a pendant shutter provided with a peep-hole connected to and operated by the lever, said shutter being disposed to be oscillated so that the peep-hole thereof is placed into and out of registration with the fixed peep-hole.

GEORGE BEAN GILMAN.

Witnesses:
CHAS. O. HUDSWORTH,
GEO. E. CLARK.

Copies of this patent may be obtained for five cents each, by addressing the "Commissioner of Patents, Washington, D. C."